(12) United States Patent
Willis

(10) Patent No.: US 7,100,970 B1
(45) Date of Patent: Sep. 5, 2006

(54) FLOORING SYSTEM FOR VEHICLE

(76) Inventor: Eddie L. Willis, 3716 Pomeroy Dr., Dallas, TX (US) 75233

( * ) Notice: Subject to any disclaimer, the term of this patent is extended or adjusted under 35 U.S.C. 154(b) by 102 days.

(21) Appl. No.: 09/644,169

(22) Filed: Aug. 23, 2000

(51) Int. Cl.
*B62D 33/02* (2006.01)

(52) U.S. Cl. .................. 296/183.1; 296/184.1; 52/800.12

(58) Field of Classification Search ......... 52/127.8, 52/476, 768, 780, 800.12; 296/182, 204, 296/181, 183, 184.1, 193.07, 182.1, 183.1
See application file for complete search history.

(56) References Cited

U.S. PATENT DOCUMENTS

| | | | | |
|---|---|---|---|---|
| 2,841,437 A | * | 7/1958 | Turpin | 296/10 |
| 4,332,203 A | | 6/1982 | Flowers | |
| 4,787,669 A | * | 11/1988 | Wante | 296/182 |
| D299,219 S | * | 1/1989 | Edwards | D12/101 |
| D306,994 S | * | 4/1990 | Edwards | D12/101 |
| 4,940,380 A | | 7/1990 | Ballyns et al. | |
| D315,537 S | * | 3/1991 | Wright | D12/97 |
| 5,215,331 A | * | 6/1993 | Pittman | 280/788 |
| 5,575,525 A | * | 11/1996 | Walworth et al. | 296/184.1 |

* cited by examiner

*Primary Examiner*—Naoko Slack
(74) *Attorney, Agent, or Firm*—Storm LLP

(57) ABSTRACT

A cargo-carrying vehicle has a plurality of flooring members. A pair of parallel, spaced-apart frame rails confines the flooring members therebetween in closely spaced adjacent relation to form a floor surface. A pair of end members extends transversely between the frame rails at the ends thereof to secure the frame members against movement parallel to the frame rails. At least one of the end members is selectively moveable relative to the frame rails to permit selective removal of one or more of the flooring members from between the frame rails.

11 Claims, 1 Drawing Sheet

FLOORING SYSTEM FOR VEHICLE

BACKGROUND OF INVENTION

1. Field of Invention

The present invention relates generally to flooring systems for vehicles adapted to carry cargo, such as trailers. More specifically, the present invention relates to flooring systems having the ability to easily repair or replace the structural members comprising the load-bearing floor.

2. Summary of Prior Art

Commonly, the load-bearing floors of many cargo-carrying vehicles (trailers and railcars principally) comprise wooden planks, usually 2×6 or 2×8. These floors are strong and light in weight, but are susceptible to damage and deterioration in use.

The typical construction of these floors provides a generally rectangular wrought iron or steel frame that is welded together. If one or more of the wooden planks becomes damaged or deteriorates and requires replacement, the frame must be cut apart and reassembled using various tools, including welding and cutting torches.

U.S. Pat. No. 4,940,380, Jul. 10, 1990, to Ballyns, et al. discloses a platform for a lift used in conjunction with a truck. Wooden planks are held in a frame that can be disassembled to permit selective removal of the planks. This disassembly causes the entire frame structure to effectively be disassembled and is not structurally sound because the removable pieces are coupled to one another. Thus this construction is not adapted to use in a trailer or vehicle in which the floor is a major structural member.

A need exists, therefore, for an improved flooring system for cargo-carrying vehicles that permits selective removal and replacement of one or more of the flooring members that comprise the floor surface of the vehicle. The system should be relatively easy to operate and should not require complete disassembly of the vehicle or a major portion thereof.

SUMMARY OF THE INVENTION

It is a general object of the present invention to provide an improved flooring system for cargo-carrying vehicles. This and other objects of the present invention are achieved by providing a plurality of flooring members. A pair of parallel, spaced-apart frame rails confines the flooring members therebetween in closely spaced adjacent relation to form a floor surface. A pair of end members extends transversely between the frame rails at the ends thereof to secure the frame members against movement parallel to the frame rails. At least one of the end members is selectively moveable relative to the frame rails to permit selective removal of one or more of the flooring members from between the frame rails.

According to the preferred embodiment of the present invention, the flooring members are wooden planks.

According to the preferred embodiment of the present invention, the frame rails are formed of angle iron.

According to the preferred embodiment of the present invention, at least one of the end members is formed of c-channel.

According to the preferred embodiment of the present invention another of the end members is hinged along its length to permit a portion of the end member confining the flooring members against movement to be rotated to a position in which the flooring members can be removed from between the frame rails.

According to the preferred embodiment of the present invention, the cargo-carrying vehicle is a trailer.

Other objects, features, and advantages of the present invention will become apparent with reference to the drawings and detailed description of the invention, which follow.

DETAILED DESCRIPTION OF THE INVENTION

Figure 1:
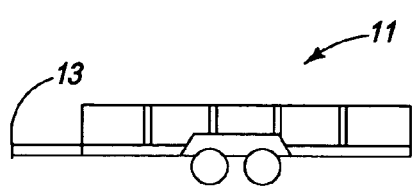
FIG. 1 is an elevation view of a cargo-carrying vehicle of the type contemplated by the present invention.
Figure 2:
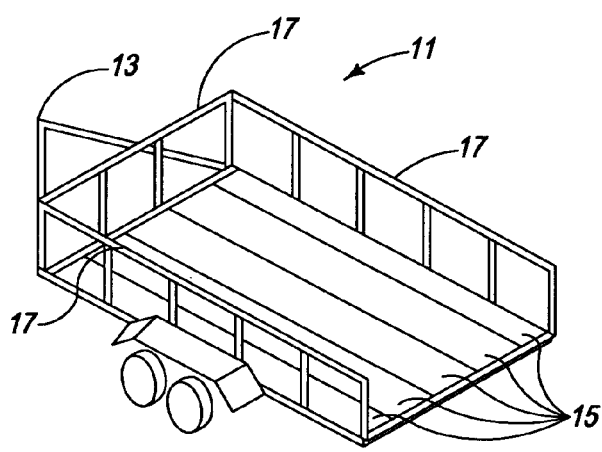
FIG. 2 is a perspective view of a cargo-carrying vehicle of t the type contemplated by the present invention, illustrating the flooring system according to the present invention.

Referring now to the Figures, and particularly to FIGS. 1 and 2, the numeral 11 designated a cargo-carrying vehicle or trailer of the type contemplated by the present invention. Trailer 11 has a hitch or other means for attaching the trailer, for towing, to another vehicle. Trailer 11, also has a load-bearing floor surface comprised of a plurality of wooden planks 15, which may be 2×4, 2×6, or 2×8 planks or boards.

The flooring surface provides the main load-bearing or cargo-carrying surface of trailer 11. Trailer 11 may be provided with upstanding rails 17 to assist in confining the cargo or load on the flooring surface. While a relatively small (e.g. 16 foot) trailer is illustrated, the present invention is useful with a variety of cargo-carrying vehicles, including the trailers used with tractor-trailers, rail cars, and the like, which employ flooring assemblies constructed primarily of planks arranged as described herein, with some minor variations.

Figure 4:
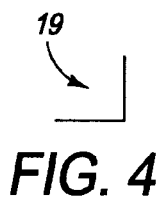
FIG. 4 is a section view, taken along the line 4—4 in FIG. 3, of an end member of the flooring system according to the present invention.
Figure 3:
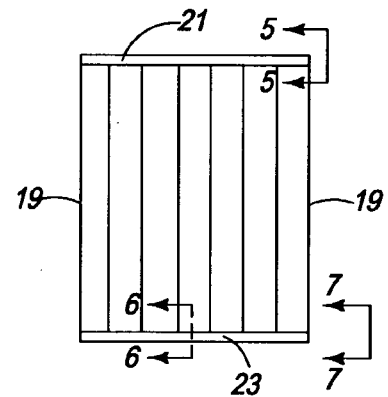
FIG. 3 is a plan view of the flooring system according to the present invention.

FIG. 3 is a plan view of the flooring system according to the present invention. The flooring surface, as stated above, comprises a plurality of planks 15, in closely spaced relation and extending longitudinally along the length of trailer 11. Planks or flooring members 15 are maintained in closely spaced relation by a pair of parallel frame rails 19. Frame rails 19 are preferably formed of angle iron (shown in cross section in FIG. 4). While angle iron is preferred, any configuration capable of maintaining the flooring members in closely spaced relation and having sufficient strength to support the flooring members and a load should be adequate.

Figure 5:
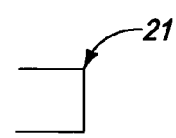
FIG. 5 is a section view, taken along the line 5—5 in FIG. 3, of an end member of the flooring system according to the present invention.

A pair of end members 21, 23 transversely connect frame rails 19 and form a rectilinear frame for flooring members 15. One of frame members 21 is constructed of c-channel, which is may be either an extruded wrought iron product or welded from angle iron and bar stock to have the cross-sectional configuration shown in FIG. 5. This cross-section permits the end member to confine flooring members from longitudinal movement relative to frame rails 19, and also prevents inadvertent removal of flooring members 15 from the frame by "capturing" their ends between the horizontal "legs" of the c-channel configuration.

Figure 6:
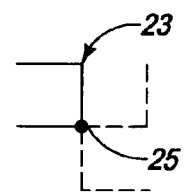
FIG. 6 is a section view, taken along the line 6—6 in FIG. 3, of a frame rail of the flooring system according to the present invention.

Another end member 23, opposite first end member 21, serves the same purpose and is formed in a c-channel configuration. However, as shown in section view in FIG. 5, a hinge is placed between one "leg" of a piece of angle iron and connects to it a section of flat bar stock. End member 23 thus is hinged along its length and the angle iron portion may be rotated from a closed position, in which flooring members 15 are confined against longitudinal movement relative to frame rails and their ends are "captured" within the c-channel configuration, to an open position (shown in phantom in FIG. 6), in which one or more of flooring members 15 can be removed and replaced. According to the preferred embodiment of the present invention, hinged end member 23 is placed opposite the end of trailer 15 having the hitch or attachment means 13. Nevertheless, both ends or the opposite end of trailer may be fitted with hinged end member 23.

Figure 7:
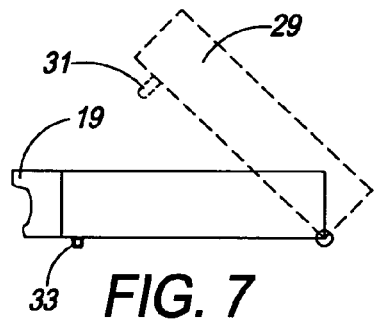
FIG. 7 is a section view, taken along the line 7—7 in FIG. 3, of a portion of the end member of FIG. 5.

FIG. 7 is a partial section view illustrating a preferred means for securing the movable portion of end member 23 in the closed position. A length of bar stock 29 is welded or otherwise secured to each end of the angle iron portion of end member 23. A stud or portion of a bolt 31 is welded to bar stock 29. In the closed position, bar stock 29 lies just inside the upstanding or vertical "leg" of the angle iron of frame rail 19. A threaded stud 31 extends through a corresponding hole in the horizontal "leg" of the angle iron. A nut 33 is used to secure stud 31, bar stock 29 and end member 23 in the closed position, securing flooring members 15 against movement within and removal from the frame defined by frame rails 19 and end members 21, 23.

In operation, floor members or planks 15 are secured within the frame of trailer 11 and perform their intended function with end member 23 in the closed position. When planks 15 deteriorate or become damaged, nuts 33 can be removed, end member 23 moved to the open position, and selected ones or all of the planks removed and replaced.

The present invention offers a number of advantages over the prior art. Principally, it permits selective removal and replacement of flooring members without complicated disassembly operations such as cutting and re-welding the frame or otherwise completely disassembling the trailer. Furthermore, the movable end member may be "retrofit" to existing vehicles.

The invention has been described with reference to a preferred embodiment thereof. Those skilled in the art will understand that it is not thus limited, but is capable of variation and modification without departing from the scope and spirit of the invention.

The invention claimed is:

1. An improved flooring system for a cargo-carrying vehicle, the system comprising:
    a plurality of flooring members;
    a pair of parallel, spaced-apart frame rails formed of angle iron, the frame rails confining the flooring members therebetween in closely spaced adjacent relation to form a floor surface; and
    a pair of end members, each of the end members being formed of c-channel, the end members extending transversely between the frame rails at the ends thereof to secure the flooring members against movement parallel to the frame rails, wherein the c-channel of one end member is hinged along its length to permit a portion of the c-channel confining the flooring members against movement to be rotated to a position in which the flooring members are selectively removable from between the frame rails.

2. The flooring system according to claim 1, wherein the flooring members are wooden planks.

3. The flooring system according to claim 1, wherein the cargo-carrying vehicle is a two-wheeled flat bed trailer.

4. An improved flooring system for a vehicle, the system comprising:
    a pair of spaced-apart, parallel frame rails formed of angle iron;
    a plurality of flooring members extending longitudinally between the frame rails and held in closely spaced adjacent relation by the frame rails;
    a first end member and extending transversely between the frame rails at one end thereof, the end member confining the flooring members against longitudinal movement between the frame rails;
    a second end member formed of c-channel extending transversely between the frame rails at an end opposite the first end member, the c-channel of the second end member being hinged along its length to permit a portion of the c-channel confining the flooring members against movement to be rotated to a position in which the flooring members are selectively removable from between the frame rails.

5. The flooring system according to claim 4, wherein the flooring members are wooden planks.

6. The flooring system according to claim 4, wherein the vehicle is a two-wheeled flat bed trailer.

7. The flooring system according to claim 4, wherein the first end member is formed of c-channel.

8. The flooring system according to claim 7, wherein the c-channel of the first end member is hinged along its length to permit a portion of the c-channel confining the flooring members against movement to be rotated to a position in which the flooring members can be removed from between the frame rails.

9. An improved flooring system for a cargo carrying vehicle, the system comprising:
    a plurality of flooring planks having a length and a width;
    a pair of parallel, spaced-apart frame rails formed of angle iron and confining the flooring planks lengthwise therebetween in closely spaced adjacent relation to form a floor surface;
    a first end member formed of c-channel and extending transversely between the frame rails at one end thereof, the end member confining the flooring planks against lengthwise movement, the c-channel of the first end member being hinged along its length so as to be movable between a closed position confining the flooring planks against lengthwise movement between the frame rails and an open position permitting selective removal of one or more of the flooring planks;
    a second end member formed of c-channel and extending transversely between the frame rails at an end opposite the first end member, the c-channel of the second end member being hinged along its length so as to be movable between a closed position confining the flooring planks against lengthwise movement between the frame rails and an open position permitting selective removal of one or more of the flooring planks.

10. The flooring system according to claim 9, wherein the flooring planks are wooden planks.

11. The flooring system according to claim 9, wherein the the cargo-carrying vehicle is a two-wheeled flat bed trailer.

* * * * *